Inventor
Charles F. Kettering

Sept. 10, 1946.   C. F. KETTERING   2,407,555
AUTOMATIC CONTROL
Filed July 30, 1943   2 Sheets-Sheet 2

Inventor
Charles F. Kettering
By Blackmor, Spencer & Flint
Attorneys

Patented Sept. 10, 1946

2,407,555

UNITED STATES PATENT OFFICE 2,407,555

AUTOMATIC CONTROL

Charles F. Kettering, Detroit, Mich., assignor to General Motors Corporation, Detroit, Mich., a corporation of Delaware Application July 30, 1943, Serial No. 496,824

20 Claims. (Cl. 172—282)

This invention relates to control means, and more specifically to automatic steering control means for mobile bodies.

In the operation of mobile bodies, such as aircraft and ships, it is advantageous to be able to set control means to maintain the body on a given course and so relieve the pilot or helmsman of the tedious task of keeping the body on the course except for occasional checking. In mobile bodies such as torpedoes, either air or water, adapted to explode upon reaching some determined objective, automatic steering of the same is of course a necessity as no manual means could be present.

It is therefore an object of my invention to provide means for automatically maintaining a mobile body on a given predetermined course.

It is a further object of my invention to provide automatic steering means for a moving body.

It is a still further object of my invention to provide compass-controlled automatic steering means for a mobile body.

With these and other objects in view which will become apparent as the specification proceeds, the embodiments of my invention are best understood by reference to the following specification and claims and the illustrations in the accompanying drawings, in which:

Figure 1:
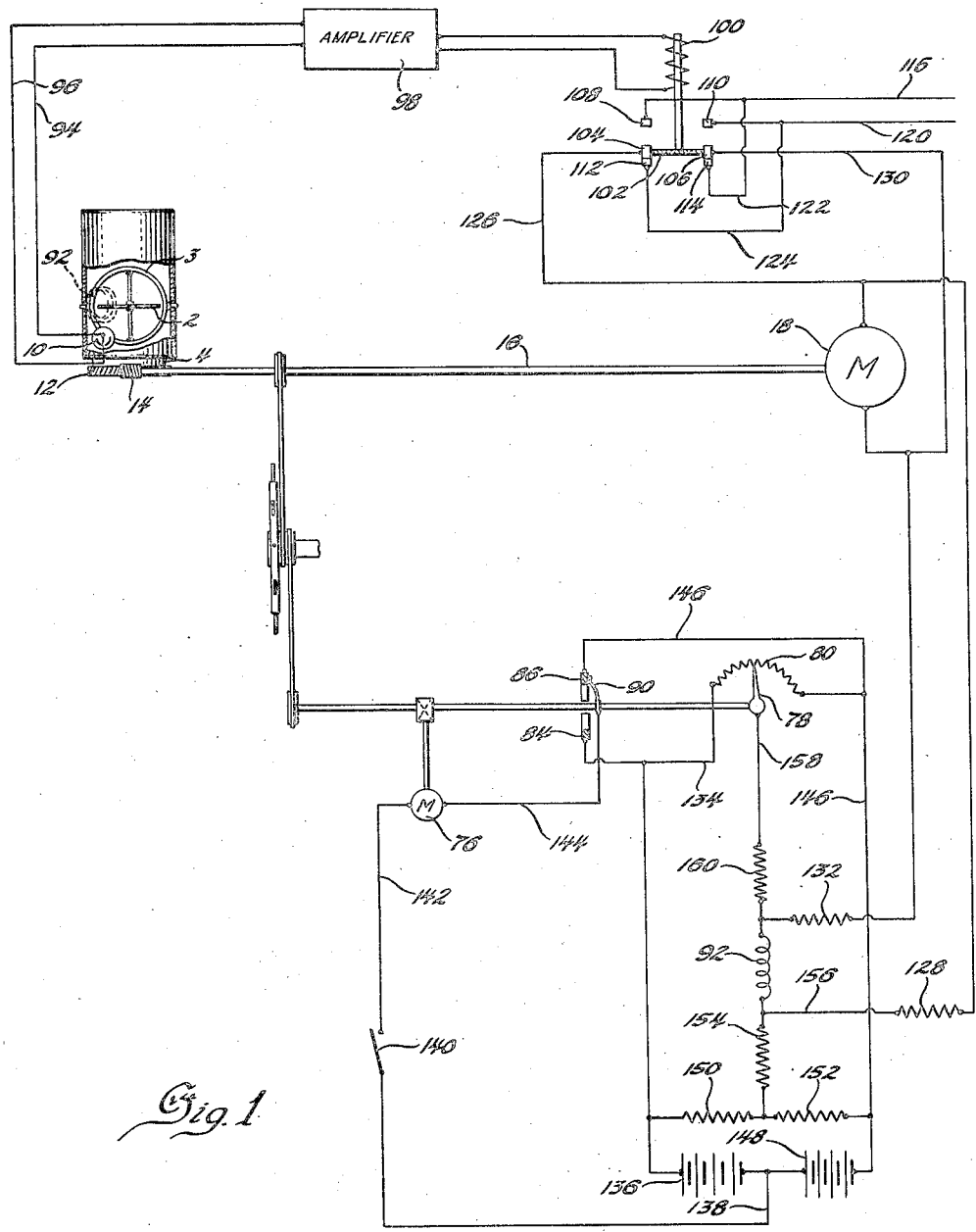
Figure 1 is a schematic wiring diagram of a control system embodying my invention.
Figure 2:
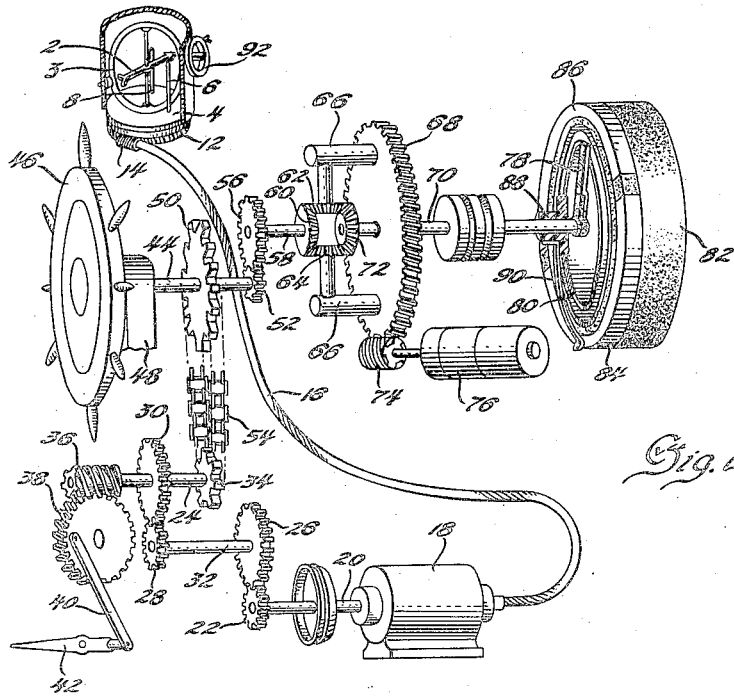
Figure 2 is a perspective schematic diagram of the parts and inter-connections of my control system.
Figure 3:
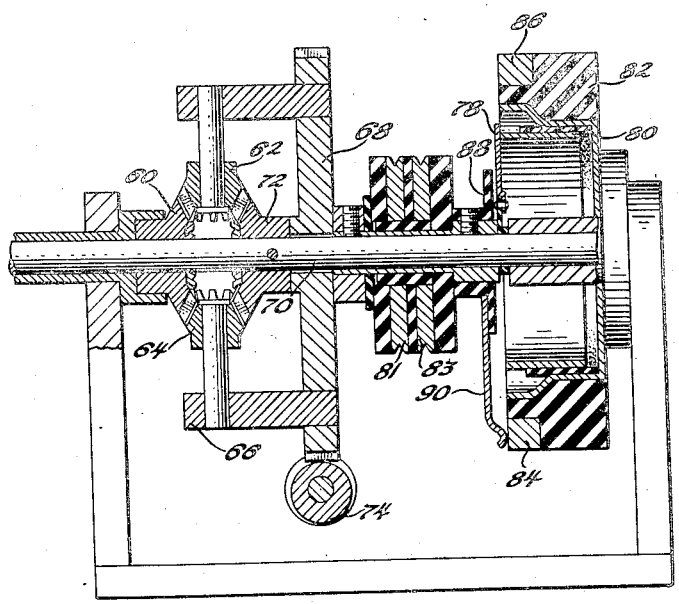
Figure 3 is an enlarged sectional view through the potentiometer and its control.

Referring now more specifically to Figure 2 of the drawings, it will be seen that the actuating control means for my system is a compass 2 pivotally mounted on a gimbaled ring 3 on a support 4 and arcuately movable between two fixed stops 6 and 8. In its movement the compass needle intercepts a light beam flowing to photocell 10 (Fig. 1) to vary the output thereof. The support 4 may be rotated about the axis of the compass by worm wheel 12 which is rigidly secured to said support and is so mounted as to be engaged by worm 14. The latter is connected to one end of a flexible drive shaft 16, the opposite end of which is attached to and driven by a motor 18. The purpose of this drive means is to provide a follow-up to prevent over-travel or over-correction in the direction of drive control of the compass.

To the shaft 20 of the motor 18 is also secured a pinion 22 which drives shaft 24 through reduction gears 26, 28 and 30, the latter being mounted on shaft 24 and the two former on an intermediate coupling shaft 32. Shaft 24 also has a sprocket wheel 34 and at a spaced axial point a worm 36, both being rigidly secured to said shaft. Worm 36 is adapted to engage a worm wheel 38 which is connected by a link mechanism 40 with a steering rudder 42 for the craft being driven. A steering shaft 44, which is adapted to cooperate with some type of steering wheel 46 or similar steering mechanism, is mounted in a portion of the frame 48 of the body and has thereon a second sprocket wheel 50 and also a small pinion 52. A drive chain 54 is adapted to run over the two sprocket wheels 50 and 34 and to cause a driving connection between the two. Thus when the steering wheel 46 is turned, the rudder 42 will rotate and steer the mobile body.

Pinion 52 is adapted to engage a gear 56 mounted on a short rotatable stub shaft 58, the opposite end of which carries a small bevel gear 60 which forms part of the differential incorporating two rotatable bevel gears 62 and 64 both engaging the bevel gear 60 at diametrically opposite points, and supported by suitable means such as pins 66 from the surface of a large gear wheel 68, said gear wheel 68 being mounted upon shaft 70 but freely rotatable with respect thereto. Shaft 70 also carries at its extreme end a bevel gear 72 which meshes with the two bevel gears 62 and 64 to complete the differential. A small worm 74 is mounted to contact the teeth of the worm wheel 68, said worm being driven by a small trim motor 76.

Mounted upon the opposite end of the shaft 70 to that upon which gear 72 is mounted is a radially extending contact arm 78 electrically insulated therefrom which is adapted to engage a circular resistor 80 mounted in an insulating housing 82 and to form therewith a variable potentiometer for purposes to be described. Mounted in housing 82 at a greater radial distance from the potentiometer resistance are two arcuate rings 84 and 86, each of which extends substantially 180°, but are separated slightly from each other by a portion of the insulating housing. An adjustable insulating collar 88 mounted on the shaft 70 carries a bowed radially extending arm 90 which is adapted to contact and move over these contact arcs 84 and 86. The electrical connections to these arms are made through slip rings 81 and 83.

In order to provide compensation for certain compass movements, which will be described more in detail at a later point, it is necessary to provide a damping or compensating coil such as that shown at 92 which is mounted on the side of the casing enclosing the needle and which operates in a manner similar to the follow-up means.

Referring now to Figure 1, there is shown the compass 2 controlling the flow of light to the photocell 10 and having mounted near one end thereof the compensating coil 92 which is shown in dotted lines mechanically, but which appears in the electrical circuit in the lower right-hand corner of the circuit diagram between the two resistors in line with the variable potentiometer tap. The photocell 10 is connected through lines 94 and 96 to a suitable amplifier 98, the output of which is connected into a relay coil 100 which operates a movable armature 102 between two limit positions. This movable armature 102 carries two spaced contacts 104 and 106 insulated from each other, which cooperates with two spaced pairs of stationary contacts 108 and 110 on one side and 112 and 114 on the opposite side. Contacts 108 and 110 are connected to a suitable source of current through lines 116 and 120, while contacts 112 and 114 are reversely connected to these same lines through inter-connecting lines 122 and 124. Contact 104 is connected through line 126 to one side of a steering motor 18 and also to resistor 128. Contact 106, on the other hand, is connected through line 130 to the opposite terminal of motor 18 and also to a resistor 132.

Potentiometer coil 80 has one end connected to line 134 which is also connected to one of the conductor arcs 84 and to one terminal of a battery 136. The opposite end of the battery 136 is connected to line 138 which terminates in switch 140, the opposite terminal of which is connected through line 142 to one terminal of the trim motor 76, this latter motor being geared to the control shaft carrying the control arms 90 and 78. The opposite terminal of the motor 76 is connected to line 144 which in turn is connected to said rotatable arm 90. This arm cooperates with the two arcuate sections 84 and 86. Section 86 is connected through line 146 to the opposite end of potentiometer 80 and to one terminal of a battery 148 whose opposite terminal is connected to line 138 and battery 136, placing the two batteries in series. Two resistors 150 and 152 are connected in series across the two batteries. A resistor 154 is connected to the midpoint of these two resistors and also to line 156 which extends to resistor 128 and one terminal of the compensating coil 92. The movable contact 78 of the potentiometer 80 is connected to line 158 which terminates in resistor 160 whose opposite terminal is connected to resistor 132 and coil 92.

In the operation of the device, the control motor 18, which is a reversible motor and can be rotated in either direction, depending upon the polarity of the current applied thereto, turns, through obvious connections, the rudder to steer the mobile vehicle, and at the same time turns the rotatable housing in which the compass is mounted to provide follow-up means. The control for this motor 18 is through the photocell 10 which in turn is energized by the amount of light falling thereon, determined by the interception of said light by the position of the compass needle. The output of the phototube is amplified and the amplified result is in turn applied to the relay roil 100. Thus, if the needle swings to one side and allows considerable light to fall onto the photocell, enough current will be provided to the relay coil 100 to cause it to attract its armature 102 and raise it up until contacts 104 and 106 engage contacts 108 and 110 respectively. This connects the motor 18 to the input lines 116 and 120 and the motor 18 rotates, turning the rudder 42 to cause the course of the mobile body to be altered slightly. At the same time, through motor energization, the casing or housing 4 for the compass is so rotated as to cause the compass needle to tend to assume a neutral position again with respect to this housing. Thus only small impulses of steering are applied to the rudder.

If now the compass assumes such a position as to intercept considerable light and the output of the photocell falls, the energy provided to the relay coil 100 will not be sufficient to maintain the armature in its uppermost position, and it will fall so that contacts 104 and 106 now engage contacts 112 and 114 and in so doing reverse the polarity of the current flowing to the motor 18 which therefore causes it to rotate in the opposite direction and move the rudder 42 also in the opposite direction. This also turns the follow-up mechanism to drive the housing 4 back to try to align the compass therewith.

Coil 92 has previously been referred to as a compensating and damping coil and its functions and operation will now be described in detail. It is a well-known fact that when compass means is tilted in any manner so that its axis is not vertical, the vertical component of the earth's field introduces a magnetic force acting on the compass, which provides an erroneous indication or operation as the case may be. In the present instance the compass needle 2 is pivotally mounted on a vertical axis within a horizontally trunnioned gimbal ring 3. The bottom of the ring is slightly heavier than the top and so the assembly tends to remain in a vertical position, irrespective of the rolling or tossing of the mobile body. When, however, the body turns, then the centrifugal force causes the gimbal ring to move out of its vertical position and therefore the vertical axis of the compass is now moved to a slanting position. The vertical component of the earth's field will now tend to rotate the compass needle to give an erroneous reading and one of the functions of the coil is to compensate for this force.

It will also be evident that the sharper the turn, the greater will be the centrifugal force and more will be the displacement and the vertical pull on the compass and therefore the restoring or compensating force must be stronger. I have provided means therefore for so controlling the field of the compensating coil that the latter varies dependent upon the displacement of the rudder. In other words, if the rudder is forced hard over, the body will execute a sharp turn, the centrifugal force will be large, and a large compensating field will be necessary. This proportional control is provided by the balanced potentiometer 78—80 and its associated circuit which provides to compensating coil 92 current from the batteries 136, 148 proportional to the rudder displacement and so poled as to repel the tendency of the needle to be attracted by the vertical component of the earth's field. It should also be pointed out that this error is more prevalent when the body is set on a north course since any deviation therefrom will tilt the vertical axis of the needle in such a plane that the vertical component of the earth's field has maximum effect. It is therefore termed the north course error. The effect of this biasing magnetic force upon the needle which is proportional to rudder displacement also acts as a magnetic follow-up device and tends to align the needle with the photocell light source to balance the same.

It will be seen by referring to Figure 1 that there are two sources of power for coil 92. The first is from batteries 136 and 148 which are connected through potentiometer 78—80 to coil 92. When the former is balanced, no current flows through the coil, but when it is unbalanced, then current will flow through the coil in a direction dependent upon which way the arm 78 moves from the center and proportional to the amount of displacement of the arm which is driven synchronously with the rudder. Therefore whichever side of neutral the rudder is moved, a biasing magnetic field will be applied to the compass needle to tend to push it back to neutral, the strength of the field being proportional to the rudder displacement.

It will be noted that there are two lines, namely, 126 and 130, which extend from the power supply for the steering motor 18 and are connected across the coil 92 through resistors 128 and 132 to provide the second source. The effect of this source of power is much less than that provided by the batteries and balanced potentiometer, but it does also provide a magnetic biasing field which tends to move the compass needle in the opposite direction from that in which the earth's field is moving it to damp the needle movement and give it a force in the opposite direction where needle movement causes the relay switch 100 to be actuated. Therefore, as the body tends to move off course, the needle will swing to one side, calling for corrective rudder, and the relay switch 100 will be actuated to drive motor 18 to move the rudder. Current will be applied to coil 92 from lines 126 and 130, creating a magnetic field to tend to force the needle back to its neutral position to prevent excessive swing. At the same time, the motor turns the compass housing to provide mechanical follow-up for the same purpose. Further magnetic field is provided by coil 92 as the rudder moves away from neutral by the simultaneous movement of the potentiometer arm 78, which field, as previously described, provides correction for the north turning error proportional to rudder displacement.

From the above it will be obvious that when the ship or craft is moving along its normal course, the potentiometer must normally be set at balanced position. If, therefore, a new course is set and the craft is turned through operation of the manual steering wheel, the potentiometer will become unbalanced and the relation between the compass housing and potentiometer changed. Therefore, after the new course has been ascertained, and the craft has been properly aligned, in order to again balance the potentiometer and regain proper relation to the control compass, switch 140 is closed which completes the circuit to the trim motor 76. The rotatable arm 90 and the arcuate conducting discs 86 and 84 on member 82 control the trim motor, and a circuit is therefore completed to this motor whose polarity and therefore the direction of rotation of the motor will depend upon whether the rotatable arm 90 is engaging arcuate member 84 or 86. Assuming that the arm 90 engages member 86 as shown in the circuit diagram, the motor circuit will be completed as follows: motor 76, line 144, arm 90, arcuate conductor 86, line 146, battery 148, line 138, switch 140, line 142, back to the motor 76. This causes the worm 74 to be rotated in a given direction. The rotation of this worm drives the worm wheel 68 which carries the two bevel gears 62 and 64 of the differential. Since at this particular instant shaft 44 is locked, due to the fact that the rudder is in correct position and so held or locked for the moment, bevel gear 60 will not rotate and the rotation of the worm wheel 68 will be transmitted through gears 62 and 64 to gear 72 and therefore rotate the shaft 70. This in turn moves arm 78 of the potentiometer and this will approach its balanced condition. The motor circuit will be broken when arm 90 reaches a point between the two arcs 84 and 86 which consists of insulating material of the member 82. It will be noted that there are two of these positions at 180° apart. Thus, when the motor circuit is broken by arm 90 riding off the conductive member, the potentiometer will again be balanced and the system adjusted.

I claim:

1. In a control system for a mobile body, steering means for the body, magnetic means responsive to the earth's terrestrial field controlling the steering means, current conducting means for creating a magnetic field mounted in juxtaposition to the magnetic means, a source of power therefor and adjustable means connected between the source of power and said conducting means controlling the flow of current to the latter and therefore the strength of the magnetic field created thereby.

2. In a control system for a mobile body, steering means for the body, magnetic means responsive to the earth's terrestrial field controlling the steering means, current conducting means for creating a magnetic field mounted in juxtaposition to the magnetic means, a source of power therefor, adjustable means connected between the source of power and said conducting means controlling the flow of current to the latter and therefore the strength of the magnetic field created thereby, and means interconnecting the adjustable means with the steering means so the two will operate in synchronism and the magnetic field generated will be proportional to the displacement of the steering means.

3. In a control system for a mobile body, steering means for the body, compass means for controlling the steering means, a coil for creating a modifying magnetic field mounted adjacent the compass, a source of power for the coil, and reversing and varying means for the current connected between the source and the coil for varying the effect of the latter on said compass.

4. In a control system for a mobile body, steering means for the body, compass means for controlling the steering means, a coil for creating a modifying magnetic field mounted adjacent the compass, a source of power for the coil, reversing and varying means for the current connected between the source and the coil for varying the effect of the latter on said compass, and means interconnecting said steering means and said reversing and varying means whereby the effect of the coil is determined by the position of the steering means.

5. In a control system for a mobile body, steering means for the body, compass means for controlling the steering means, a coil for creating a modifying magnetic field mounted adjacent the compass, a source of power for the coil, balanced potentiometer means connected between the source of power and coil and means interconnecting the potentiometer and the steering means whereby as the latter is moved from its center position, current of one polarity or the other will be applied to the coil and increased in proportion to the deflection of said steering means.

6. In a control system for a mobile body, steering means for the body, compass means for controlling the steering means, a coil for creating a modifying magnetic field mounted adjacent the compass, a source of power for the coil, balanced potentiometer means connected between the source of power and coil, means interconnecting the potentiometer and the steering means whereby as the latter is moved from its center position, current of one polarity or the other will be applied to the coil and increased in proportion to the deflection of said steering means, driving means differentially connected into the interconnection between the steering means and the potentiometer, means connecting the driving means to the source of power and switching means between the source and the driving means actuated by the movement of the interconnecting means to bring the potentiometer to balanced position.

7. In a control system for a mobile body, steering means for the body, reversible driving means for turning the latter in either direction, reversing switching means controlling the driving means, compass means connected to and operating the switching means, a coil mounted in juxtaposition to the compass means and connected across the driving means whereby as the polarity of the current to the driving means is reversed, the current flow through the coil will also be reversed and the effect of the coil's magnetic field on the compass will likewise be reversed.

8. In a control system for a mobile body, steering means for the body, reversible driving means for turning the latter in either direction, reversing switching means controlling the driving means, compass means connected to and operating the switching means, a coil mounted in juxtaposition to the compass means and connected across the driving means whereby as the polarity of the current to the driving means is reversed, the current flow through the coil will also be reversed and the effect of the coil's magnetic field on the compass will likewise be reversed, a separate source of power, and a balanced potentiometer connected thereto and to the coil whereby any unbalance of the potentiometer will cause additional bias voltage to be applied to the coil which may aid or oppose the first voltage to modify the effect thereof.

9. In a control system for a mobile body, steering means for the body, reversible driving means for turning the latter in either direction, reversing switching means controlling the driving means, compass means connected to and operating the switch means, a coil mounted in juxtaposition to the compass means and connected across the driving means whereby as the polarity of the current to the driving means is reversed, the current flow through the coil will also be reversed and the effect of the coil's magnetic field on the compass will likewise be reversed, a separate source of power, a balanced potentiometer connected thereto and to the coil whereby any unbalance of the potentiometer will cause additional bias voltage to be applied to the coil which may aid or oppose the first voltage to modify the effect thereof, and movable means for varying the setting on the potentiometer driven by the driving means.

10. In a control system for a mobile body, steering means for the body, reversible driving means for turning the latter in either direction, reversing switching means controlling the driving means, compass means connected to and operating the switching means, a coil mounted in juxtaposition to the compass means and connected across the driving means whereby as the polarity of the current to the driving means is reversed, the current flow through the coil will also be reversed and the effect of the coil's magnetic field on the compass will likewise be reversed, a separate source of power; a balanced potentiometer connected thereto and to the coil whereby any unbalance of the potentiometer will cause additional bias voltage to be applied to the coil which may aid or oppose the first voltage to modify the effect thereof, movable means for varying the setting on the potentiometer driven by the driving means, and a second driving means for returning the potentiometer to balanced condition when energized.

11. In a control system for a mobile body, steering means for the body, a reversible driving motor connected to said steering means, a source of power, reversing switching means connected to the source and motor to control the same, compass means to actuate the switching means, a coil mounted adjacent the compass means to create a biasing field therefor and connected to the reversing switching means whereby it will be energized simultaneously with the motor.

12. In a control system for a mobile body, steering means for the body, a reversible driving motor connected to said steering means, a source of power, reversing switching means connected to the source and motor to control the same, compass means to actuate the switching means, a coil mounted adjacent the compass means to create a biasing field therefor and connected to the reversing switching means whereby it will be energized simultaneously with the motor, a separate source of power, a resistance connected across said source, a movable contact engaging said resistor and connected to said coil, means connecting said coil to the second source of power whereby when the circuit is balanced, no current flows through the coil from the separate source, but when unbalanced, current may flow in either direction, depending upon the direction of unbalance.

13. In a control system for a mobile body, steering means for the body, a reversible driving motor connected to said steering means, a source of power, reversing switching means connected to the source and motor to control the same, compass means to actuate the switching means, a coil mounted adjacent the compass means to create a biasing field therefor and connected to the reversing switching means whereby it will be energized simultaneously with the motor, a separate source of power, a resistance connected across said source, a movable contact engaging said resistor and connected to said coil, means connecting said coil to the second source of power whereby when the circuit is balanced, no current flows through the coil from the separate source, but when unbalanced, current may flow in either direction, depending upon the direction of unbalance, and means interconnecting the steering means and the movable contact to cause them to move together to apply an additional biasing force to the compass means, dependent upon the position of the steering means.

14. In a control system for a mobile body, steering means for the body, a reversible driving motor connected to said steering means, a source of power, reversing switching means connected to the source and motor to control the same, compass means to actuate the switching means, a coil mounted adjacent the compass means to create a biasing field therefor and connected to the reversing switching means whereby it will be energized simultaneously with the motor, a separate source of power, a resistance connected across said source, a movable contact engaging said resistor and connected to said coil, means connecting said coil to the second source of power whereby when the circuit is balanced, no current flows through the coil from the separate source, but when unbalanced, current may flow in either direction, depending upon the direction of unbalance, means interconnecting the steering means and the movable contact to cause them to move together to apply an additional biasing force to the compass means, dependent upon the position of the steering means, a second driving motor, and interconnecting means between this second motor and the movable contact to provide for driving said movable contact to balanced position without moving said steering means.

15. In a control system, steering means, means including compass means controlling the steering means, and means for creating a magnetic field in the vicinity of the compass means energizable simultaneously with the steering means to create a repulsive force in an opposite direction to that in which the compass tends to move due to the terrestrial field.

16. In a control system, compass means, means controlled thereby to steer a mobile body on a predetermined course and magnetic biasing means in juxtaposition to the compass means energized from the control means to create a magnetic field to tend to cause the compass to move in a direction opposite from that in which the terrestrial field tends to move it.

17. In a control system, steering means, reversible driving means connected to said steering means for turning the latter in either direction, pivotal compass means controlling the driving means and means for creating a magnetic field in the vicinity of said compass to bias the same connected to said driving means and energized simultaneously therewith.

18. In a control system for a mobile body, steering means for the body, reversible driving means for turning the latter in either direction, compass means, switching means controlled by the compass means to actuate the driving means, means for creating a biasing magnetic field in the vicinity of the compass means connected to and energized simultaneously with the driving means to damp the movement of the compass.

19. In a control system for a mobile body, steering means for the body, reversible driving means for turning the latter in either direction, compass means, switching means controlled by the compass means to actuate the driving means, means for creating a biasing magnetic field in the vicinity of the compass means connected to and energized simultaneously with the driving means and an additional source of adjustable power connected to the magnetic means to supplement the power supplied thereto from the driving means.

20. In a control system for a mobile body, steering means for the body, reversible driving means for turning the latter in either direction, compass means, switching means controlled by the compass means to actuate the driving means, means for creating a biasing magnetic field in the vicinity of the compass means connected to and energized simultaneously with the driving means, an additional source of adjustable power connected to the magnetic means to supplement the power supplied thereto from the driving means, and means for adjusting the value of the last-named power means actuated by the driving means.

CHARLES F. KETTERING.